United States Patent Office 3,045,665
Patented July 24, 1962

3,045,665
INSTRUMENT FOR MAINTAINING CONSTANT OXYGEN PARTIAL PRESSURE AND MEASURING OXYGEN CONSUMPTION
Peter Moyat, Bergen-Enckheim, Germany, assignor to Hartmann & Braun Aktiengesellschaft, Frankfurt am Main, Germany, a corporation of Germany
Filed Sept. 11, 1957, Ser. No. 683,341
Claims priority, application Germany Sept. 22, 1956
3 Claims. (Cl. 128—2.07)

The general object of the present invention is to provide a direct measurement of changes of the partial pressure of oxygen in closed gas chambers. Such measurements are necessary for determining, for instance, the oxygen consumption of animals, plants, microorganisms etc., or for determining the consumption of oxygen during chemical reactions such as oxidation.

A more specific object of the invention is to provide a device which will enable the measure of substantially instantaneous rates of consumption of oxygen during an oxidation process, maintain a substantially constant oxygen concentration for the process, and measure the integrated oxygen requirements over a period of time.

Hitherto it has often been customary in the determination of oxygen consumption by biological and other chemical reactions to measure the decrease in the total volume or pressure of a relatively small volume of an atmosphere containing oxygen in which the reaction takes place, with any gaseous reaction product such as $CO_2$ being absorbed from such an atmosphere. Particularly for the measurement of oxygen consumption of living beings this method has the great disadvantage that the oxygen existing at the beginning of the measurement is consumed during the measurement. Therefore such measurements can only extend over shorter periods since otherwise after a short time the measurement would be effected in an atmosphere containing considerably less oxygen than under normal conditions, a circumstance which results in faulty measurements.

The present invention provides a closed gas chamber in which the process to be tested takes place and to which an exactly defined quantity of oxygen is dosed in accordance with the quantity consumed. This is achieved by means of an electrolytic cell through which an electric current flows. A gas line connects the electrolytic cell to the gas chamber in which the process to be tested takes place. The current flowing through the electrolytic cell is controlled by a pressure measuring device responsive to changes in gas pressure in the chamber in such manner that a lowering of pressure increases the current flow so that more oxygen is produced by electrolysis. The oxygen produced compensates for that used in the reaction under study and hence the current flow is an indication of oxygen used per unit of time.

In the drawing two of many possible embodiments of the invention are shown wherein—

Figure 1:
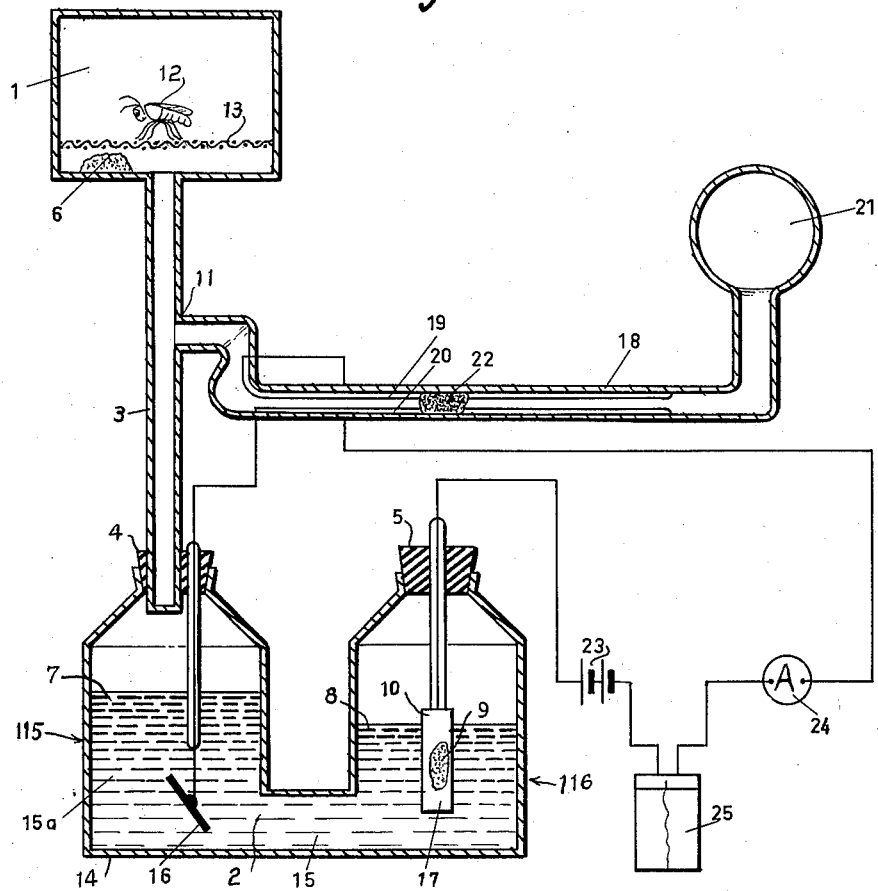
FIG. 1 is a diagrammatic representation of one form of the invention.

FIG. 1 shows an apparatus specially suitable for the determination of a very small oxygen consumption. This apparatus comprises an electrolytic cell 15 with the anode portion 15a connected to a chamber 1 in which the oxygen consuming process takes place. The cell 15 comprises a U tube 14 having legs 115 and 116 containing acid electrolyte 2, e.g. dilute sulfuric acid solution. The anode leg 115 is connected to said chamber 1 by a tube 3 passing through a stopper 4 while the cathode leg is sealed off from the atmosphere as by a stopper 5. It is to be noted that the levels 7 and 8 of electrolyte in the anode and cathode legs need not be at equal heights. This is because generation of oxygen from the anode 16 is not accompanied by generation of hydrogen from the cathode 17 for the latter is provided with an oxidizing agent 9, such as manganite, about the cathode contained in a porous bag 10 similar to a well-known depolarizing bag. The liberation of hydrogen is thus prevented.

For gaseous communication with the chamber 1, as by a tap 11 on the tube 3, a nearly horizontal capillary tube 18 is connected at one end, which capillary tube contains two long resistance wires 19 and 20, the latter being insulated from each other. These wires are arranged in series with the electrolytic cell fed by a D.C. current source 23. At the other end of the capillary tube a small gas bulb 21 is provided to seal off the effects of changes in atmospheric pressure. A small slug or drop of mercury 22 in the capillary in contact with wires seals off the chamber and cell from the gas in bulb 21. This mercury drop is displaced in a horizontal direction depending on the existing pressure in the gas chamber 1. This arrangement acts as a manometer control for electrical resistance. Depending on its position, the mercury drop imparts an accordingly lower or higher resistance to the electrolytic circuit. The pressure in the chamber 1 tends to drop if the process examined consumes oxygen, whereupon the mercury drop will tend to move to the left in the drawing and thus decrease the effective resistance of the wires 19 and 20. As a result, a greater current tends to flow with more rapid evolution of oxygen until equilibrium is reached. The current flow as determined by an ammeter 24 and/or recording meter 25 is a direct measure of the evolution and consumption of oxygen.

The device, of course, is suitable only when there can be no uncontrolled change of pressure due to formation of gas by the process studied in the chamber. If, for instance, the study is of the metabolism of an insect 12 on a screen 13, in the chamber, a suitable carbon dioxide absorber 6 is used to prevent build up of pressure by carbon dioxide.

Figure 2:
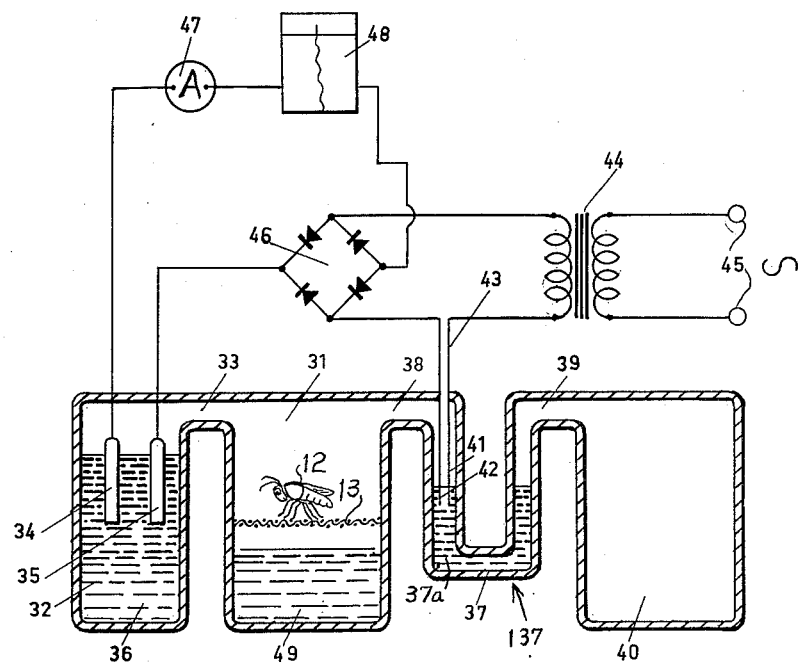
FIG. 2 is a representation of another form of the invention.

As another form of the invention, FIG. 2 shows a modified form of the chamber as a vessel 31 in which the oxygen consuming process takes place. This vessel is connected to an electrolytic cell 32 by means of a gas line 33. Electrodes 34 and 35 as well as the electrolyte 36 of this electrolytic cell have been chosen in such a way that with a flow of current there is oxygen liberated at the anode, whereas at the cathode no gas will be produced. It was found that platinum is a very suitable material for the anode, copper for the cathode and saturated copper-sulphite solution as electrolyte. A manometer or pressure gauge 37 is connected to the measuring vessel responsive to pressure changes therein and in the electrolytic cell 32. In the present case this gauge functions according to the principle of a liquid-pressure gauge with constant counter-volume and essentially comprises a U-tube partially filled with an electrolyte solution 37a of a salt such as sodium chloride, one end of the tube being connected via the gas line 38 to the measuring vessel 31 in which the reaction consuming oxygen takes place. The other end of the U-tube manometer 37 is connected via the gas line 39 to vessel 40 closed on all other sides and containing inert gas under normal atmospheric pressure. In the U-tube manometer 37 two sensing electrodes 41 and 42 are arranged for partial immersion into the electrolyte 37a to provide a manometer variable resistor designated 137 of the water rheostat type responsive to the pressure in the vessel 31. The manometer or variable resistor is electrically interposed via conductors 43 between a full wave rectifier 46 and the output of a transformer 44 connected to a constant A.C. voltage source 45. The D.C. output of the rectifier is connected to electrodes 34 and 35 of the electrolytic cell 32. The current flowing through the electrolytic cell 32 is measured by means of a current flow indicating instrument 47 or recorder 48. If the apparatus is used for determining the oxygen consumption of biological reactions, a known carbon dioxide absorbent such as a solution of sodium hydroxide 49 is placed into the vessel, this substance absorbing the carbon-dioxide produced by the biological reaction, such as the metabolism of insect 12 supported on screen 13. In operation, the insect utilizes oxygen causing the oxygen and total pressure in the vessel, cell and left leg of the manometer to fall to a small degree. Consequently the electrolyte in the left leg rises, and, with electrodes 41 and 42 so designed that the manometric variable resistor 137 passes current as a function of the height of the electrolyte, rate of oxygen evolution is a direct function of this height. Under these circumstances, equilibrium is substantially attained and current passing through the cell is a measure of the oxygen evolved and of the oxygen consumed. The electrolytic current can be measured or recorded by means of ammeter or current-flow instrument 47 and recorder 48. Time integrals may be determined by using an ampere-hour meter. Due to the use of a pressure sensing manometer with constant countervolume, the arrangement shown is entirely independent from pressure and temperature fluctuations of the ambient atmosphere. Only temperature differences between the measuring cell and the pressure sensing manometer can influence the measurement. However such temperature differences can easily be avoided by simple means. The pressure sensing manometer being fed with A.C., the producton of gas at the sensing electrodes is avoided.

For series tests or statistical tests often a larger number of apparatus is required for measuring the oxygen consumption. It has proved advantageous to combine a number of such instruments in one unit and to use a multiple recorder for recording the measuring values.

I claim:

1. A device for measuring metabolic rates in a process wherein carbon dioxide is evolved, said device comprising a closed chamber wherein the process may take place, an electrolytic cell for producing oxygen and closed off from the atmosphere; a duct connecting the cell and chamber for passage of oxygen from the anode portion to the chamber; means for suppressing the formation of hydrogen by the cell; a source of current for the cell; a variable resistor interposed between the source and the cell and responsive to gas pressure changes in the cell and chamber for making the flow of current through the cell responsive to deviation in oxygen pressure from that oxygen pressure initially in the cell and irrespective of barometric pressure changes; an absorber for removing carbon dioxide from the chamber, and an ammeter for detecting flow of current through the cell.

2. A device for measuring metabolic rates in a process wherein carbon dioxide is evolved, said device comprising a closed chamber wherein the process may take place, an electrolytic cell for producing oxygen and closed off from the atmosphere; a duct connecting the cell and chamber for passage of oxygen from the anode portion to the chamber; a source of current for the cell; a variable resistor interposed between the source and the cell and responsive to gas pressure changes in the cell and chamber; an absorber for removing carbon dioxide from the chamber, an ammeter for detecting flow of current through the cell, said cell containing in the electrolyte thereof an oxidizing agent to prevent the formation of hydrogen during passage of current through the cell.

3. A device for measuring metabolic rates in a process wherein carbon dioxide is evolved, said device comprising a closed test chamber wherein the process may take place, an electrolytic cell for producing oxygen, and closed off from the atmosphere and containing an oxidizing agent to prevent liberation of hydrogen from the cell; a duct connecting the cell and chamber for passage of oxygen from the anode portion to the chamber; an absorber for removing carbon dioxide from the chamber; a surge chamber; a small U-tube containing an electrolyte and having the respective sides thereof connected in gas-communication with the surge chamber and cell; electrical conductors dipping into the tube side connected with the cell to form a water rheostat with the electrolyte; a source of A.C. electricity and rectifier therefor, said rheostat being interposed between the source and the rectifier; means for connecting the output of the rectifier to the cell, and means for measuring the flow of current from the rectifier to the cell, whereby increased evolution of oxygen from the cell will tend to depress the electrolyte in the U-tube to increase the resistance of the rheostat and decrease the flow of current to the cell.

References Cited in the file of this patent

UNITED STATES PATENTS

| | | |
|---|---|---|
| 1,154,009 | Goddard | Sept. 21, 1915 |
| 1,369,204 | Taylor | Feb. 22, 1921 |
| 1,380,183 | Boisen | May 31, 1921 |
| 1,401,035 | Boisen | Dec. 20, 1921 |
| 1,581,944 | Hausmeister | Apr. 20, 1926 |
| 2,098,629 | Knowlton | Nov. 9, 1937 |
| 2,701,790 | Goument | Feb. 8, 1955 |
| 2,773,497 | Anzi et al. | Dec. 11, 1956 |

FOREIGN PATENTS

| | | |
|---|---|---|
| 341,149 | Germany | Sept. 26, 1921 |
| 189,214 | Germany | Nov. 19, 1905 |

OTHER REFERENCES

Leach article, Science, vol. 103, No. 2672, pages 341 and 342. (A copy is in Div. 55.)